Patented July 21, 1931

1,815,747

UNITED STATES PATENT OFFICE

HERMANN WAGNER, OF BAD-SODEN-AM-TAUNUS, ALBERT KISSLING, OF FRANKFORT-ON-THE-MAIN-HOCHST, ERNST HOTZ, OF HATTERSHEIM, NEAR FRANKFORT-ON-THE-MAIN, AND WILHELM FITZKY, OF FRANKFORT-ON-THE-MAIN-HOCHST, GERMANY, ASSIGNORS TO GENERAL ANILINE WORKS, INC., OF NEW YORK, N. Y., A CORPORATION OF DELAWARE

2-HALOGEN-3-CHLORO-4-AMINO-1-METHYLBENZENE-5-SULPHONIC ACIDS AND PROCESS OF PREPARING THEM

No Drawing. Application filed August 8, 1929, Serial No. 384,492, and in Germany September 7, 1928.

The present invention relates to 2-halogen-3-chloro-4-amino-1-methylbenzene-5-sulphonic acids and a process of preparing them, more particularly it relates to compounds of the following general formula:

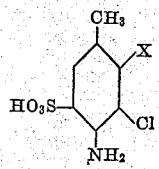

wherein X stands for a chlorine or a bromine atom.

We have found that these compounds which have been unknown up to the time of the present invention are obtainable uniformly and in a manner which can easily be carried out in practice by treating a compound of the following general formula:

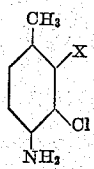

wherein X stands for a chlorine or a bromine atom, either with concentrated sulfuric acid alone at elevated temperature, as, for instance, at about 170° C. to 200° C., or by causing one molecular proportion of such a compound dissolved in concentrated sulfuric acid to react with one molecular proportion of sulfuric anhydride dissolved in concentrated sulfuric acid. In this latter case the formation of the sulphonic acid sets in even at a considerably lower temperature, namely at amout 100° C. to 130° C.

The following examples serve to illustrate our invention but they are not intended to limit it thereto, the parts being by weight.

(1) 176 parts of 2.3-dichloro-4-amino-1-methylbenzene, obtainable according to U. S. patent specification No. 1,712,173, are heated for about 1½ to 3 hours with about 250 to 450 parts of concentrated sulfuric acid up to a temperature of 170° C. to 200° C., while stirring. After cooling the mixture is poured on about 1,000 parts of pounded ice. The 2.3-dichloro-4-amino-1-methylbenzene-5-sulphonic acid thus formed of the following formula:

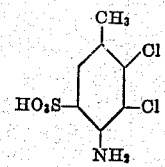

is precipitated during this operation and is filtered by suction. The compound may be purified by redissolution by way of its magnesium salt. The sulphonic acid thus obtained is a white powder; it forms a sparingly soluble sodium salt and more readily soluble ammonium or magnesium salts; it can very easily be diazotized.

(2) 220.5 parts of 2-bromo-3-chloro-4-amino-1-methylbenzene obtainable according to the process of the above mentioned patent specification by starting from 2-bromo-4-amino-1-methylbenzene, are treated as described in the preceding example with about 250 to 450 parts of concentrated sulfuric acid. The 2-bromo-3-chloro-4-amino-1-methylbenzene-5-sulphonic acid of the following formula:

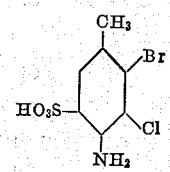

is worked up and purified in the manner described in Example 1.

(3) 176 parts of 2.3-dichloro-4-amino-1-methylbenzene are dissolved in about 500 parts of sulfuric acid monohydrate, 150 parts of fuming sulfuric acid containing about 60 to 65 per cent of sulfuric anhydride are then added and the mixture is heated for about 2 hours up to 100° to 130° C., while stirring. After cooling the mass is poured upon ice and the 2.3-dichloro-4-amino-1-methylbenzene-5-sulphonic acid precipitating during this operation is isolated and purified as stated in example 1. The compound thus obtained is identical with that obtained according to Example 1 and has the above given formula.

We claim:
1. The process which comprises heating a compound of the following general formula:

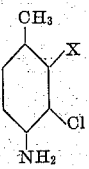

wherein X stands for a chlorine or a bromine atom, with concentrated surfuric acid to a temperature of about 170° C. to about 200° C.

2. The process which comprises heating 2.3-dichloro-4-amino-1-methylbenzene with concentrated sulfuric acid to a temperature of about 170° C. to about 200° C.

3. The process which comprises heating 1 part by weight of 2.3-dichloro-4-amino-1-methylbenzene with a quantity of about 1½ to about 2½ parts by weight of concentrated sulfuric acid to a temperature of about 170° C. to 200° C. for about 1½ to 3 hours, while stirring.

4. As new products, the compounds of the following general formula:

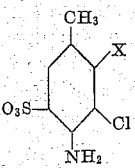

wherein X stands for a chlorine or a bromine atom, being white powders and forming sparingly soluble sodium- but more readily soluble ammonium or magnesium salts and being very easily diazotizable.

5. As a new product, the 2.3-dichloro-4-amino-1-methylbenzene-5-sulphonic acid of the formula:

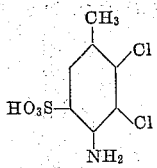

being a white powder, forming a sparingly soluble sodium salt and more readily soluble ammonium or magnesium salts and being very easily diazotizable.

In testimony whereof, we affix our signatures.

HERMANN WAGNER.
ALBERT KISSLING.
ERNST HOTZ.
WILHELM FITZKY.